(12) United States Patent
Durrant et al.

(10) Patent No.: US 6,691,120 B1
(45) Date of Patent: Feb. 10, 2004

(54) SYSTEM, METHOD AND COMPUTER PROGRAM PRODUCT FOR DATA MINING IN A NORMALIZED RELATIONAL DATABASE

(75) Inventors: Douglas J. Durrant, Mission Viejo, CA (US); Bruce E. Aldridge, Oceanside, CA (US)

(73) Assignee: NCR Corporation, Dayton, OH (US)

( * ) Notice: Subject to any disclaimer, the term of this patent is extended or adjusted under 35 U.S.C. 154(b) by 271 days.

(21) Appl. No.: 09/608,085

(22) Filed: Jun. 30, 2000

(51) Int. Cl.[7] ............................. G06F 17/30; G06F 7/00; G06F 17/00
(52) U.S. Cl. ..................... 707/100; 707/104.1; 707/2; 707/4
(58) Field of Search ................. 707/100, 2, 4, 707/104.1

(56) References Cited

U.S. PATENT DOCUMENTS 6,044,366 A * 3/2000 Graffe et al. ................. 707/2
6,058,392 A * 5/2000 Sampson et al. ............. 707/6
6,298,342 B1 * 10/2001 Graffe et al. ................. 707/4
6,363,391 B1 * 3/2002 Rosenstell, Jr. ............. 707/102

* cited by examiner

*Primary Examiner*—Safet Metjahic
*Assistant Examiner*—Cindy Nguyen
(74) *Attorney, Agent, or Firm*—Lyon & Lyon, LLP (57) ABSTRACT

A method and system for preparing a data record with multidimensional attributes for processing by a data-mining tool includes the steps of identifying a normalized data record, which includes an existing attribute comprising a plurality of dimensions, and generating a plurality of new attributes corresponding to the plurality of dimensions of the existing attribute. The method further includes creating an REI data record comprising the plurality of new attributes. The method further includes associating a plurality of value instances corresponding to the dimensions of the existing attribute with the plurality of new attributes.

23 Claims, 6 Drawing Sheets

SYSTEM, METHOD AND COMPUTER PROGRAM PRODUCT FOR DATA MINING IN A NORMALIZED RELATIONAL DATABASE

BACKGROUND OF THE INVENTION

1. Field of the Invention

The present invention relates generally to data mining of normalized databases, and more particularly to a system, method and computer program product for transforming normalized data records with multidimensional attributes into row-entity-integrity tables for use by a data-mining tool.

2. Related Art

Traditional data warehousing uses only partially normalized data models. Typical data warehousing models include star, snowflake or constellation type schema. Such schema commonly utilize a large central "fact table", and a series of look-up tables for multidimensional attributes. Detailed data for the multidimensional attributes can be aggregated at various levels, depending on the particular need. However, there is still only one level of relation in typical data warehousing models. By storing the warehoused data in this form, traditional data warehousing reduces required storage space, while minimizing difficulties associated with data mining in a normalized database containing multidimensional attributes.

The aforementioned schema work well for traditional data warehousing applications, such as those deployed in the finance, marketing and retail sectors. In these applications, the main facts (tracked attributes) rarely change. Moreover, the tracked attributes almost never change in dimension. For example, attributes such as name, address, phone, age, sex, account number, item purchased, etc. are constants within the data model. This constant nature of the data allows optimization of traditional data warehousing schema for query and analysis. The query and analysis tools are also optimized for the particular application.

The manufacturing industry, on the other hand, has not implemented general data warehousing and analysis methods because the attributes measured in a discrete or process oriented manufacturing system can, and do, vary over time and between product families. For example, manufactures of disk drives track thousands of attributes ranging from time and place of manufacture to product family to head resistance. Many of these tracked attributes are multidimensional, and many change their dimensionality over time, or even cease to exist as a tracked attribute. As new technologies are introduced, the tracked attributes change. This is known as having a "slowly moving dimension."

When a tracked attribute changes, index lines into the database tables, which help in querying the database, must be reconstructed. As the quantity of data being stored in modern data warehousing systems continues to grow, this re-indexing becomes problematic. For example, manufactures of disk drives commonly manufacture many tens of thousands of disk drives each day. For each of these drives, manufacturers typically record and track thousands of attributes, many of which are multidimensional. Additionally, the technology that goes into each disk drive commonly changes significantly every nine to twelve months, and the test programs used for the drives commonly change on a weekly basis, both of which require attribute changes and thus re-indexing. Over a number of years, the amount of data and the number of attributes involved make the re-indexing task exceptionally time consuming and expensive. Thus, modem data warehousing is moving toward using more normalized data models, such as third normal form, to further reduce the use of storage space, to minimize re-indexing, and to reduce modification anomalies caused by ongoing, changes to the tracked attributes.

Data-mining tools are software-based data-analysis methods for finding interesting patterns in large volumes of data. Data mining commonly uses predefined algorithms to look for these patterns in the data. Typical predefined data-mining algorithms include clustering algorithms, correlation analysis, association, decision tree, or neural networks. Traditional data-mining tools require that data be input as a flat table (or flat file), i.e. a single two-dimensional table. Moreover, traditional data-mining tools assume that the flat table. input is a row-entity-integrity (REI) table. An REI table is one in which each row is guaranteed unique, and each row represents a distinct and separate data item. Data-mining tools make this assumption about their input in order to enable the use of simple probability analyses in their data-mining algorithms.

Some current data-mining tools provide Open DataBase Connectivity (ODBC) through which data from a database can be imported and analyzed. However, because the data tracked in many modem data warehouses exist at different levels of aggregation, the data imported by these ODBC tools cannot be provided directly to the data-mining algorithms for analysis without causing problems.

Using traditional data-mining tools with traditional data warehousing systems is difficult and time consuming if the data has multidimensional attributes. Because traditional data-mining tools cannot accept a normalized database with multi-dimensional attributes as input, a person commonly serves as the intermediary between the data warehouse and the data mining. Typically, the person generates queries to select portions of the data and output it as a flat table. This flat table is then given as input to the data-mining tool. However, because the data-mining tool makes assumptions about the input that are not true, its output must always be carefully reviewed for non-sequiturs, i.e. observations about the data which are not relevant or logical.

Figure 1:
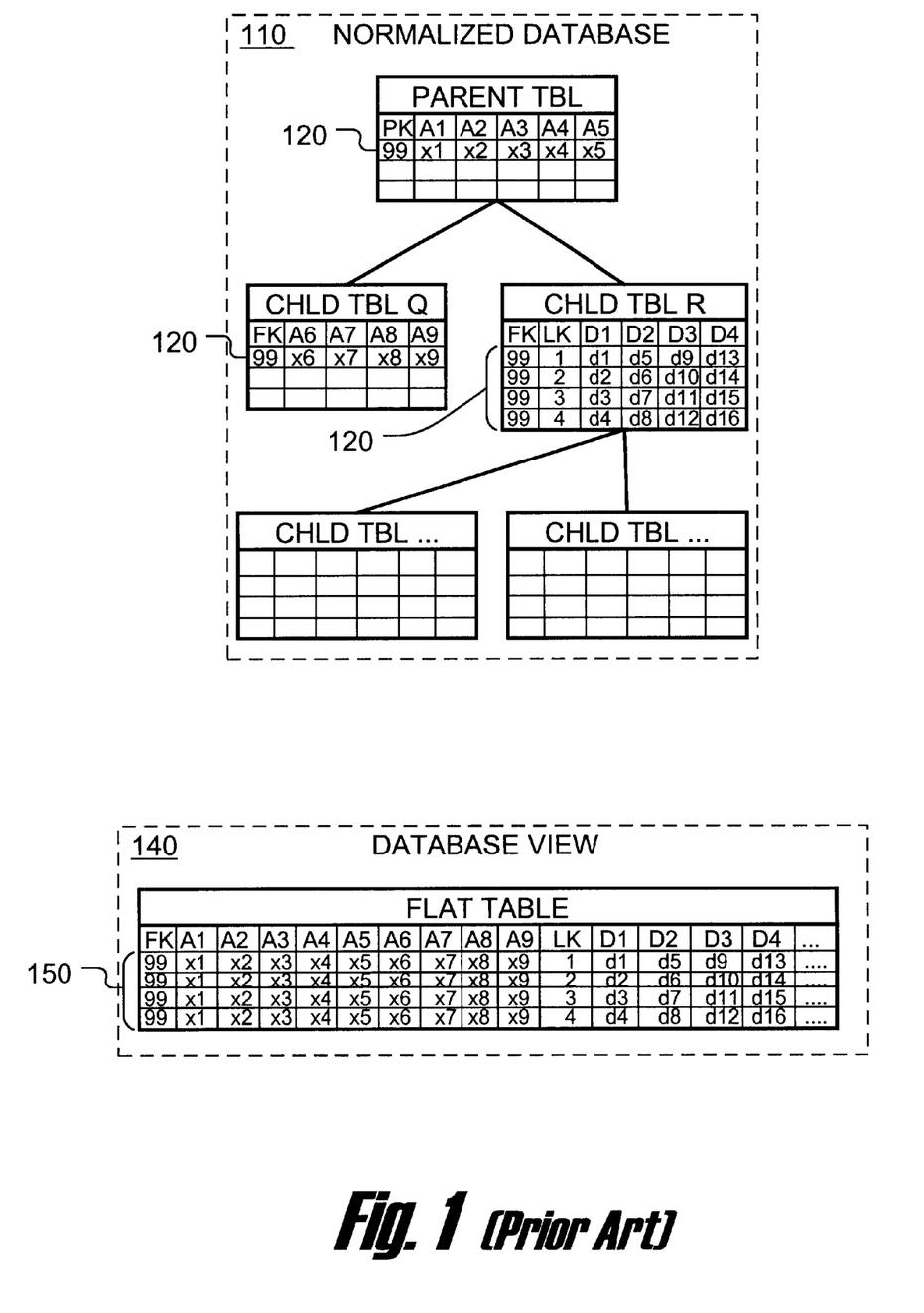
FIG. 1 is a block diagram illustrating an exemplary normalized database and a prior art database view for use by a data-mining tool.

FIG. 1 is a block diagram illustrating an exemplary normalized database and a prior art database view for use by a data-mining tool. Referring now to FIG. 1, a normalized database 110 comprises multiple tables and a normalized data record 120. Each table in the normalized database 110 has attributes associated with it. For example, the parent table has attributes PK, A1, A2, A3, A4, and A5. Attribute PK is labeled as such because it serves as a primary key for the parent table. The primary key PK uniquely identifies each row in the parent table. Moreover, because each row in the parent table represents a distinct and separate data item, the parent table, by itself, is an REI table and is thus in a form suitable for input to standard data-mining tools.

Child table R, on the other hand, contains multidimensional attributes. The primary key for child table R is compound (or composite) because it includes both a foreign key attribute FK and a local key attribute LK. For example, if FK is a serial number of a particular disk drive, and LK is a head for the particular disk drive, then each attribute D1 through D4 is a data measure for the disk drive, aggregated at the head level. If one wished to perform data mining on child table R at the drive level (which is to say that each drive is considered the distinct and separate data item), then child table R is not an REI table and is not in a form suitable for input to standard data-mining tools.

This is further illustrated by a database view 140, which can be a standard database query, a specialized database script, or the like. A database view is generally a database script, which creates either on the fly, or permanent tables that exist in a denormalized form. These tables can contain actual values, or simply indices into the normalized database 110. When the normalized data record 120 is collected from the normalized database 110, an output data record 150 is created, but this output data record 150 is not an REI data record for the level of aggregation found in the parent table. Data values x1 through x9 (or indices to these values) are repeated unnecessarily, but more importantly, each row does not represent a distinct and separate data item. The overrepresentation of some attributes can cause the data-mining tool to find significant patterns where there are none.

Moreover, when separate but related attributes are aggregated at different levels, a database view will vary the amount of representation of a data item depending on the manner in which the database view is generated. Thus some data will be treated as more significant by the data-mining tool, even though it is not. These overrepresentation issues cause significant problems with the results of a traditional data-mining analysis.

Due to these problems, traditional data-mining analyses of data with multidimensional attributes must always be carefully reviewed. A person must determine when the data-mining tool has found a false pattern caused by the way the query to the data warehouse was generated. The person must iteratively generate new queries in an attempt to eliminate the overrepresentation problem. Typically, eighty percent of the time invested in data-mining activities is spent getting the data into the correct format for the data-mining tool. This bottleneck between data warehousing and data mining is a significant problem for those with data warehouses storing large quantities of data, and a need to find patterns contained within that data.

In addition, modern manufactures have a strong need for data mining using stratified sampling. Stratified sampling is where a probability of taking a data element from a favored population in a data set is greater than a probability of taking a data element from a non-favored m population. Stratified sampling is very useful to manufacturers, which need to model the causes of "quality bubbles." For example, if a manufacturer of disk drives produces one thousand bad drives out of one hundred thousand disk drives produced in a day, this one percent error rate becomes a major problem if all one thousand bad drives are shipped to the same customer.

Some modern data-mining tools provide for stratified sampling, but in practice they do not work when the data contains multi-dimensional variables. With such data, a failed disk drive can have a row in a data table that does not show the failure on the drive. Thus, by chance alone, a failed drive can be misidentified as a non-failed drive in modern data-mining tools, even when the data-mining tool uses stratified sampling.

Therefore, what is needed is a method for transforming a normalized database into an REI table representation for use by a data-mining tool, and an integrated data-mining system, enabling linking of various types of data-mining analysis methods and stratified sampling, for direct use with normalized databases with multi-dimensional attributes and for use with standard database querying tools.

SUMMARY OF THE INVENTION

This invention can be regarded as a method for preparing a data record with multidimensional attributes for processing by a data-mining tool. The method includes the steps of identifying a normalized data record, which includes an existing attribute comprising a plurality of dimensions, and generating a plurality of new attributes corresponding to the plurality of dimensions of the existing attribute. The method further includes creating an REI data record comprising the plurality of new attributes. The method further includes associating a plurality of value instances corresponding to the dimensions of the existing attribute with the plurality of new attributes.

This invention can also be regarded as a method for transforming a subset of a normalized database with multidimensional attributes into an REI table for processing by a data-mining tool. The method includes the steps of selecting a data-item key and identifying a composite key comprising the data-item key and a local key attribute. The method further includes the steps of determining a dimensionality of the local key attribute and generating new non-key attributes based upon the dimensionality of the local key attributes and non-composite-key attributes. The method further includes creating an REI table defined by the data-item key and the new non-key attributes. The method further includes associating value instances with the REI table.

This invention can also be regarded as a data-mining system for use with a database stored in a normalized form and for use with a database-querying tool. The data-mining system includes a data-mining core, an attribute pivoter and a system manager coupled with the data-mining core and the attribute pivoter. In a preferred embodiment, the data-mining system further includes an input/output interface providing Open DataBase Connectivity. Also in a preferred embodiment, the data-mining core is designed in a modular fashion such that new data-mining tools can be plugged in without extensive modifications of the data-mining system.

Finally, in one embodiment, the system manager is designed to integrate the attribute pivoter with the data-mining core such that custom. sampling of data, for a first step of data mining, occurs before the attribute pivoter pivots the data. The system manager is further designed to provide integrated and stratified sampling such that favored data is separated and sampled prior to pivoting.

This invention can also be regarded as a data-mining computer program product for causing a processor to execute a process that pivots multidimensional attributes thereby enabling a data-mining system to analyze data stored in a normalized database having multidimensional attributes. The data-mining computer program product includes instructions for identifying a composite key comprising a data-item key and a local key attribute. The data-mining computer program product further includes instructions for generating new non-key attributes based upon a dimensionality of the local key attribute and non-composite-key attributes. The data-mining computer program product further includes instructions for creating an REI table defined by the data-item key and the new non-key attributes. Finally, the data-mining computer program product further includes instructions for associating value instances with the REI table.

Further features and advantages of the invention as well as the structure and operation of various embodiments of the invention are described in detail below with reference to the accompanying drawings.

DETAILED DESCRIPTION OF THE INVENTION

The present invention is directed toward data mining of normalized databases, and more particularly to transforming normalized data records containing multidimensional attributes into REI tables for use by a data-mining tool. The present invention is disclosed and described herein in terms of a data-mining system for-use as an interface between standard data-warehousing tools and standard data-mining tools. However, after reading this description it will become apparent to one of ordinary skill in the art how to implement the invention in alternative embodiments and alternative environments. For example, the present invention may also be implemented in a data-mining system that includes customized data-mining tools. As such, the description of this example embodiment should not be construed to limit the scope and breadth of the present invention.

Figure 2:
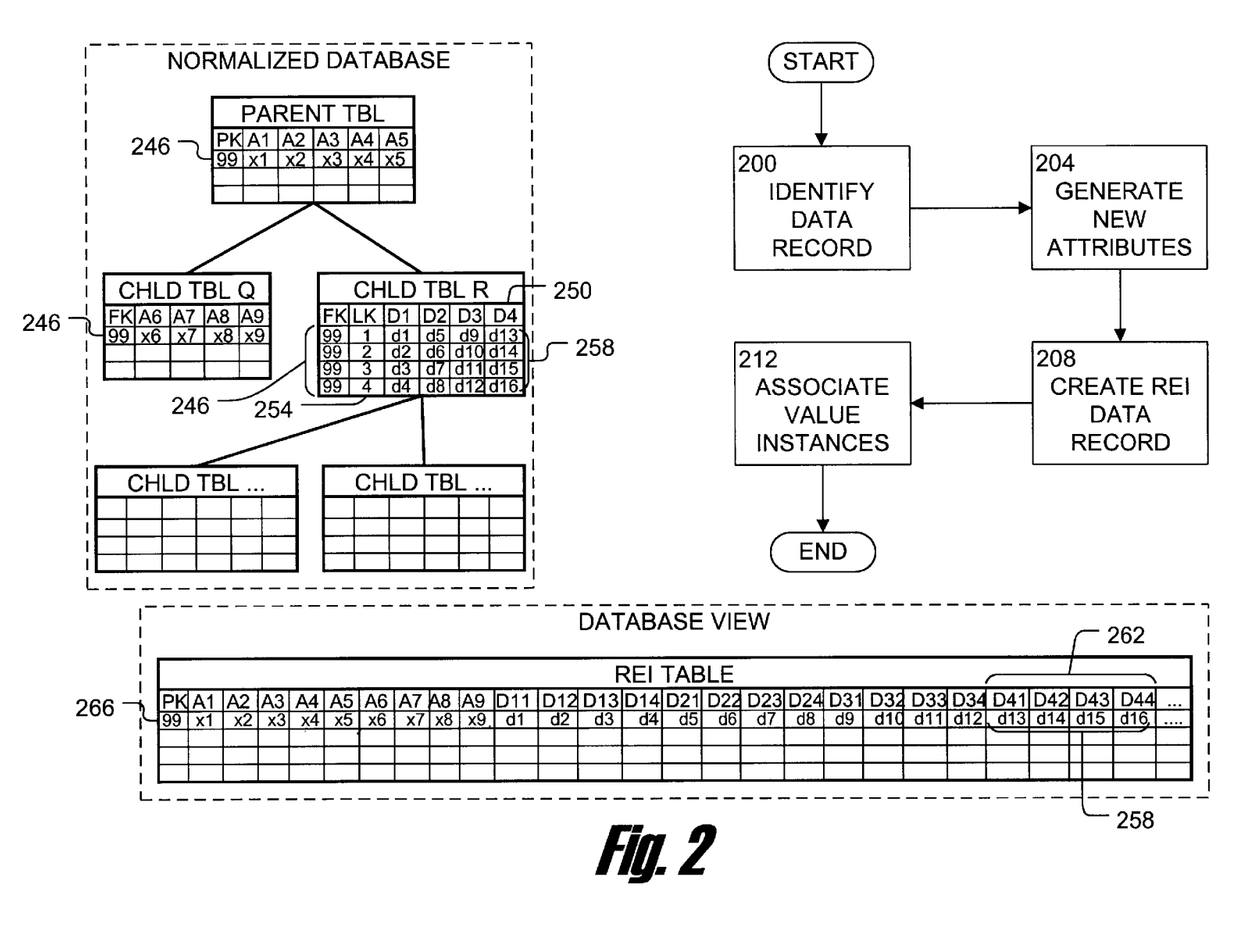
FIG. 2 is a flowchart depicting a method for transforming normalized data records into REI data records, and a block diagram illustrating an exemplary normalized database and a database view for use by a data-mining tool, according to one embodiment of the present invention.

FIG. 2 is a flowchart depicting a method for transforming normalized data records into REI data records, and a block diagram illustrating an exemplary normalized database and a database view for use by a data-mining tool, according to one embodiment of the present invention. The method can generally be thought of as a pivot; that is, pivoting multidimensional attributes making up a normalized data record into multiple new attributes making up an REI data record. Referring now to FIG. 2, the method begins with step 200, in which a normalized data record 246, with a multidimensional attribute 250, is identified. In a preferred embodiment, step 200 automatically recognizes that attribute D4 is the multidimensional attribute 250 by determining a level of aggregation for child table R. This is done by checking a definition for child table R, which includes constraint and domain information for a local key LK. The constraint and domain information for the local key LK defines a plurality of dimensions 254.

In an alternative embodiment, step 200 is performed by checking level information stored within child table R. In yet another alternative embodiment, step 200 queries a user to identify the level of aggregation of child table R.

Following step 200, new attributes 262 are generated in step 204. The new attributes 262 correspond to the plurality of dimensions 254 and the multidimensional attribute 250. Additional new attributes are also generated in step 204 for each multidimensional attribute D1, D2, D3, etc.

In a preferred embodiment, names for the new attributes include a name for the local key, values for the plurality of dimensions 254, and names for the multidimensional attributes. In this fashion, no information is lost during a pivot of the multidimensional attributes into the new attributes. For example, if child table R is a head table, a foreign key FK is a serial number for a disk drive, the local key LK. is a head number for that disk drive, and the multidimensional D4 attribute 250 is a resistance, then the names for the new attributes 262 would be, "head_1_resistance," "head_2_resistance," "head_3_resistance" and "head_4_resistance."

In an alternative embodiment, the names generated in step 204 include information regarding a total dimensionality for the plurality of dimension 254. For example, in the immediate example, the names for the new attributes 262 would be, "head_4_1_resistance," "head_4_2_resistance," "head_4_3_resistance" and "head_4_4_resistance." This is done to enable easy distinctions between dimensional attributes with similar names. For example, in the immediate example, some disk drives have four heads, while others have six heads, thus a new attribute named "head_4_2_resistance" may be completely unrelated to a new attribute named "head_6_2_resistance," even though they are both measurements of resistance on head two of a disk drive.

In a preferred embodiment, step 204 is only performed once for each table, because if a normalized data record has any data entries in a table, that normalized data record has a data entry for each attribute defined by the table. However, in an alternative embodiment, step 204 is performed more than once for each table.

Following step 204, an REI data record 266 is created in step 208. The REI data record 266 is created in step 208 such that it is defined by the new attributes generated in step 204 and any additional attributes making up the normalized data record 246. The REI data record 266 is part of an REI table for use with data-mining tools.

In step 212, value instances, including a plurality of value instances 258, are associated with the any additional attributes and the new attributes, including the new attributes 262, in the REI data record 266. In a preferred embodiment, the association performed in step 212 is accomplished by determining indices into the normalized database, and saving these indices in the REI table. In this fashion, storage space is saved and modification anomalies are minimized.

Figure 3A:
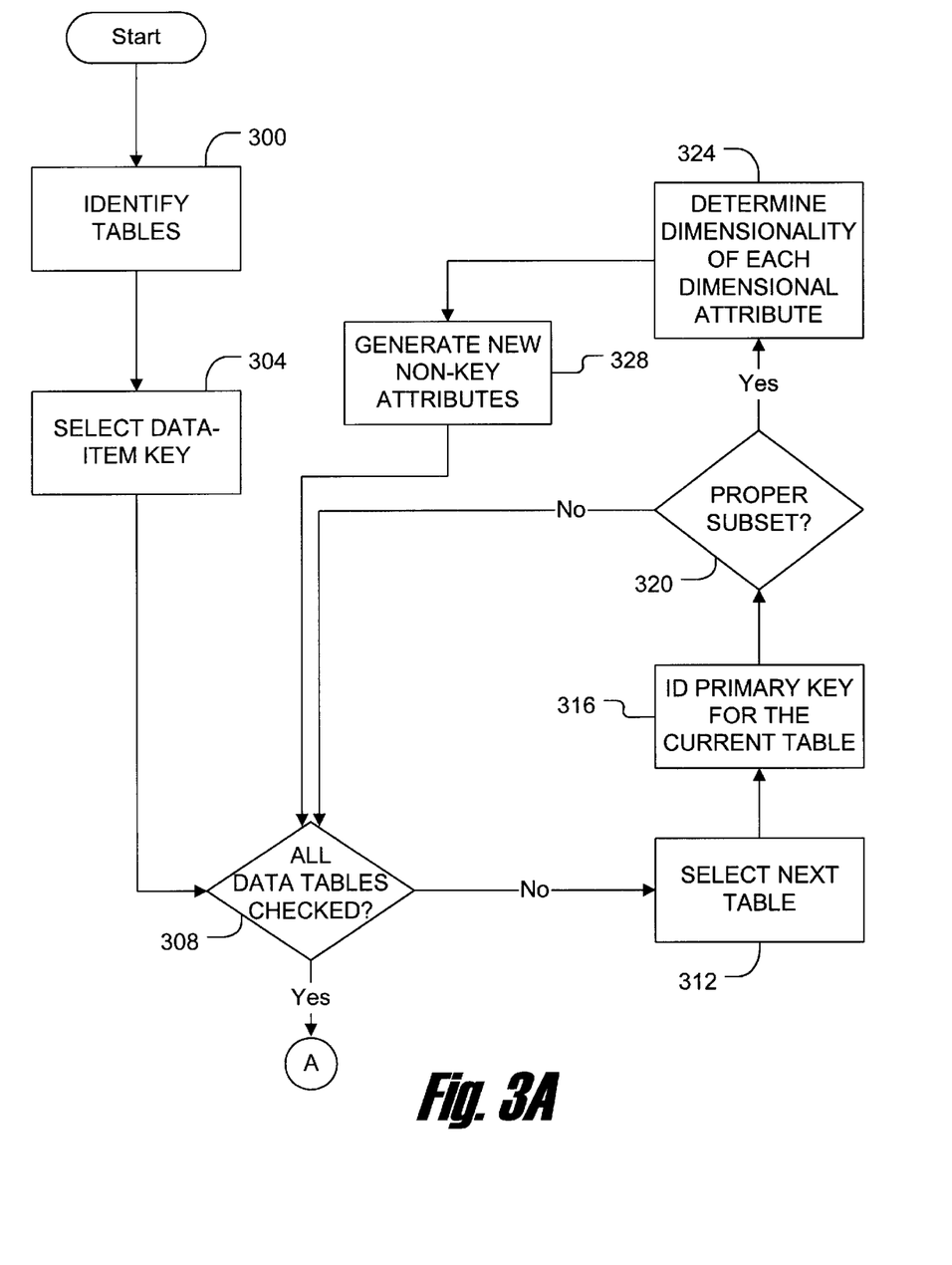
FIGS. 3A and 3B are a flowchart depicting a method for transforming a normalized database into an REI table representation for use by a data-mining tool according to one embodiment of the present invention.
Figure 3B:
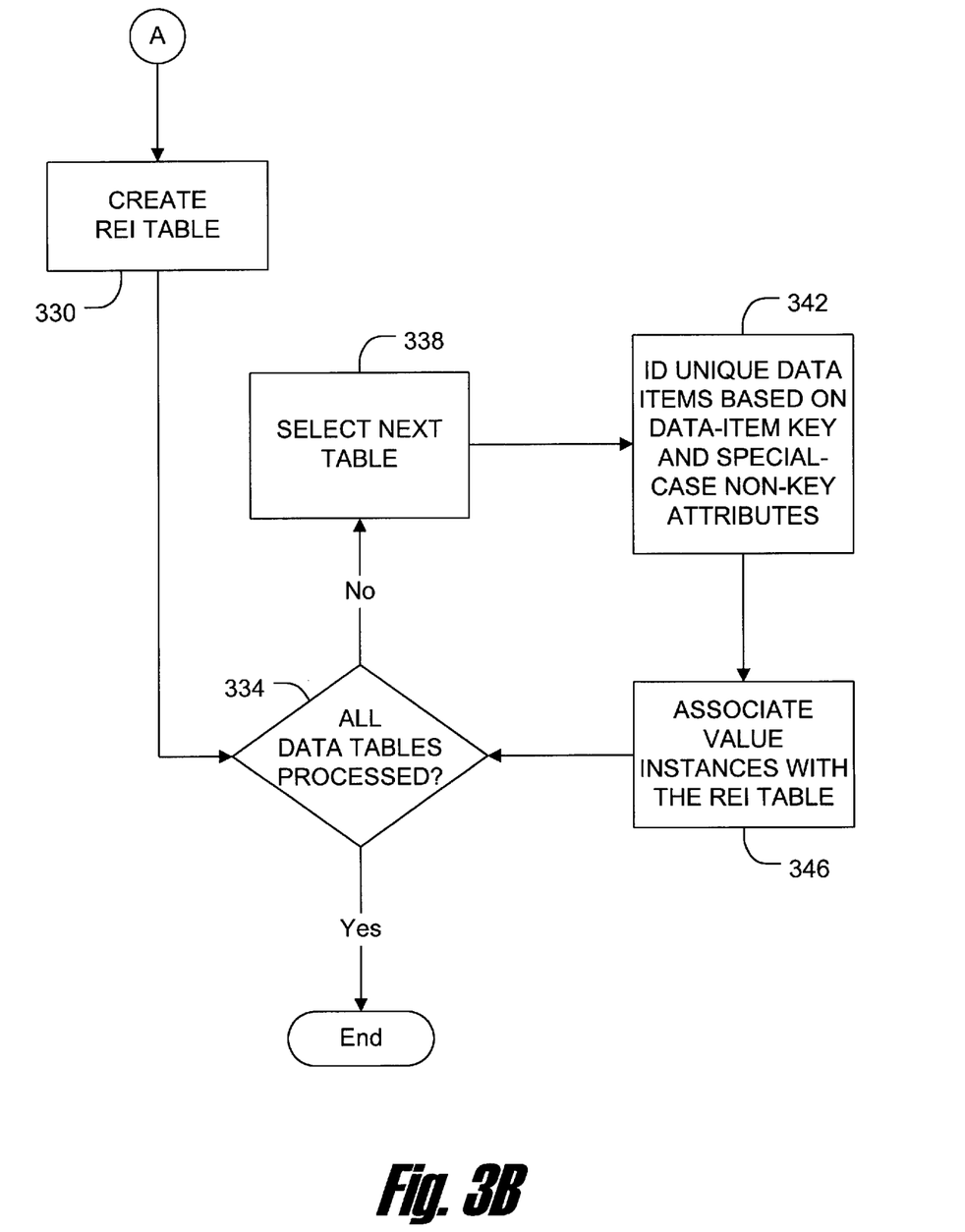

FIGS. 3A and 3B are a flowchart depicting a method for transforming a normalized database into an REI table representation for use by a data-mining tool according to one embodiment of the present invention. The method can generally be thought of as a pivot; that is, pivoting the normalized database into the REI table representation by transforming multidimensional non-composite-key attributes making up a normalized data record into multiple new non-key attributes making up an REI data record. Referring now to FIG. 3A, the method begins with step 300 in which tables making up the normalized database, or a portion thereof, to be transformed are identified. Usually, only a portion of the normalized database is transformed into the REI table representation at one time. This portion is specified by a set of normalized data records, which are selected using a standard database querying tool or the present invention. The set of normalized data records reside in a subset of the tables making up the normalized database. This subset of the tables is identified in step 300.

In step 304, a data-item key is selected. The data-item key uniquely identifies each distinct and separate data item in the subset of the tables. The data-item key will be the primary key for the REI table representation created by the method disclosed herein. The data-item key can be a single attribute or multiple attributes, and may or may not be present in each table in the normalized database. For example, for a disk drive manufacturer, the data-item key could be selected to be a serial number attribute in step 304, in preparation for pivoting data records aggregated at the head and zone level before performing data-mining at the drive level. Alternatively, the data-item key could be selected to be a serial number attribute and a head number attribute in step 304, in preparation for pivoting data records aggregated at the zone level before performing data-mining at the head level.

In a preferred embodiment, step 304 is performed by first looking for a predefined data-item key, and then querying a user of the present invention, if necessary, thereby obtaining a user selected data-item key. The user selected data-item key is then stored for future use as the predefined data-item key. The user may also change the predefined data-item key as desired.

In an alternative embodiment, the data-item key is selected in step 304 by a process that searches the subset of the tables to find a pervasive attribute. The pervasive attribute is then selected to be the data-item key.

Following step 304, a first repeating process is begun in step 308. In step 308, the first repeating process checks whether all data tables in the subset of the tables have been checked for multidimensional attributes. If so, the first repeating process ends, and the method continues with step 330 on FIG. 3B. If not, the first repeating process moves on to step 312.

In step 312, the next table from the subset of the tables is selected to be a current table for processing. In step 316, a local primary key is identified for the current table. The local primary key is at least one local attribute that uniquely identifies each row in the current table.

In step 320, the first repeating process determines if the set of attributes making up the data-item key is a proper subset of the set of attributes making up the local primary key. If so, the set of attributes making up the local primary key comprises the set of attributes making up the data-item key and at least one dimensional attribute (each of which is a local key attribute), and the process moves to step 324. If not, the current table does not contain multi-dimensional variables, and the process returns to step 308.

In some cases, the set of attributes making up the data-item key may be a proper subset of the set of attributes making up the local primary key, but will not be identified as such in step 320. If the local primary key consists of the data-item key and a local key attribute that is not a dimensional attribute, then the process returns to step 308. For example, in the disk drive manufacturing example, the local primary key for the current table can be a serial number attribute (the data-item key) and a manufacture date attribute (the local key attribute that is non-dimensional). A disk drive that has been reworked appears in the normalized database twice. A data record for the reworked drive will have the same serial number as a data record for the pre-reworked disk drive, and a later manufacture date. In most data-mining situations, only the reworked drive data is analyzed because the disk drive that is actually shipped to customers is the one that counts. Thus, the manufacture date attribute is non-dimensional because only one of multiple data rows uniquely identified by the manufacture date attribute will be placed in an REI file for data mining.

In a preferred embodiment, step 320 is performed by checking a definition for the current table, which includes constraint and domain information for the set of attributes making up the local primary key. If constraint and domain information for one or more of the attributes making up the local primary key indicates that it is non-dimensional (e.g. if it is not limited to only a finite set of sequential values), then that attribute is not counted in the determination of whether the set of attributes making up the data-item key is a proper subset of the set of attributes making up the local primary key. In addition, that. attribute is from then on treated as a special-case non-key attribute, and not one of the at least one dimensional attribute.

In an alternative embodiment, step 320 is performed by obtaining input from the user. This input indicates which attributes from the current table are part of the local primary key, which are non-composite-key attributes, and which are special-case non-key attributes.

In step 324, the first repeating process determines a dimensionality for each of the at least one dimensional attribute. In a preferred embodiment, step 324 is performed by checking constraint and domain information. The dimensionality determined in step 324 consists of a total-dimensions integer and a set of domain values for each of the at least one dimensional attribute.

In step 328, new non-key attributes are generated. The new non-key attributes correspond to non-composite-key attributes in the current table and the set of domain values for each of the at least one dimensional attribute. In a preferred embodiment, names for the new non-key attributes include a name from the at least one dimensional attribute, the set of domain values for the at least one dimensional attribute, and a name from names for the non-composite-key attributes. In this fashion, no information is lost during a pivot of the non-composite-key attributes into the new non-key attributes.

For example, if the current table is a head table, the data-item key is a serial number for a disk drive, the at least one dimensional attribute is a head number for a head on the disk drive, a r non-composite-key attribute is a resistance, and a set of domain values for the at least one dimensional attribute is [1,2,3,4,5,6], then the names for the new non-key attributes would be, "head_1_resistance," "head_2_resistance," "head_3_resistance," "head_4_resistance," "head_5_resistance" and "head_6_resistance."

When the first repeating process finishes checking all the tables, and thus finishes generating new non-key attributes, this determination is made in step 308, and the method proceeds to step 330 on FIG. 3B.

Referring now to FIG. 3B, an REI table having a primary key, which is the data-item key, is created in step 330. The other attributes for the REI table are any single-dimension attributes from the set of tables and the new non-key attributes generated in step 328.

Following step 330, a second repeating process is begun in step 334. In step 334, the second repeating process checks whether all data tables in the subset of the tables have been processed, thereby associating value instances with the REI table. If so, the second repeating process ends, as does the method. If not, the second repeating process moves on to step 338.

In step 338, the next table from the subset of the tables is selected to be a current table for processing. In step 342, each unique data item in the current table is identified using the data-item key and the special-case non-key attributes, if present. Every data row in the current table with identical value(s) for the data-item key is potentially part of the same data item. However, when the special-case non-key attributes are present, then some data rows are excluded entirely. Which data rows are excluded is determined in step 342 by examining each of the special-case non-key attributes to find a priority value.

In a preferred embodiment, the user specifies which values for the special-case non-key attributes are treated as the priority value for a specific special-case non-key attribute. In a related embodiment, the priority value is determined as a default by standardized value comparison techniques, selected after examining constraint and domain information for the specific special-case non-key attribute. For example, if the specific special-case non-key attribute is the manufacture date attribute, then the priority value is the later manufacture date as determined by standardized date comparison subroutines.

Following step 342, the second repeating process associates value instance with the REI table for the current table in step 346. The value instances associated in step 346 are those that come from unique data items identified in step 342. In a preferred embodiment, the association performed in step 346 is accomplished by determining indices into the normalized database, and saving these indices in the REI table. In this fashion, storage space is saved and modification anomalies are minimized.

Additionally, in a preferred embodiment, when a value instance is not available for a particular data item for one of the new non-key attributes generated in step 328, the associating step 346 inserts a Not/Applicable (N/A) indication in the REI table. For example, a head table in a normalized database can contain all data attributes aggregated at the head level of a disk drive. All data items in the normalized database can have their head level value instances stored in the head table, even if some of the disk drives (data items) have six heads, while others only have four heads. In this example, the four headed disk drives do not have measurements for the new non-key attributes "head_5_resistance" and "head_6_resistance," thus these data items will have a N/A indication inserted in the REI table under these new non-key attributes in step 346.

The method disclosed in FIGS. 3A and 3B is presented in terms of two separate passes through the set of tables for the purpose of clarity. However, those skilled in the art will understand from the disclosure herein that the method encompasses multiple variations on the order and placement of the steps shown. For example, the method can also be implemented using only a single pass through the set of tables, where the first repeating process and the second repeating process are a single repeating process.

In addition, those skilled in the art will understand that the method disclosed herein, while presented in terms of creating an REI table, is equally capable of creating a database view. The database view is a database script, which can be used to create the REI table at a later time.

Figure 4:
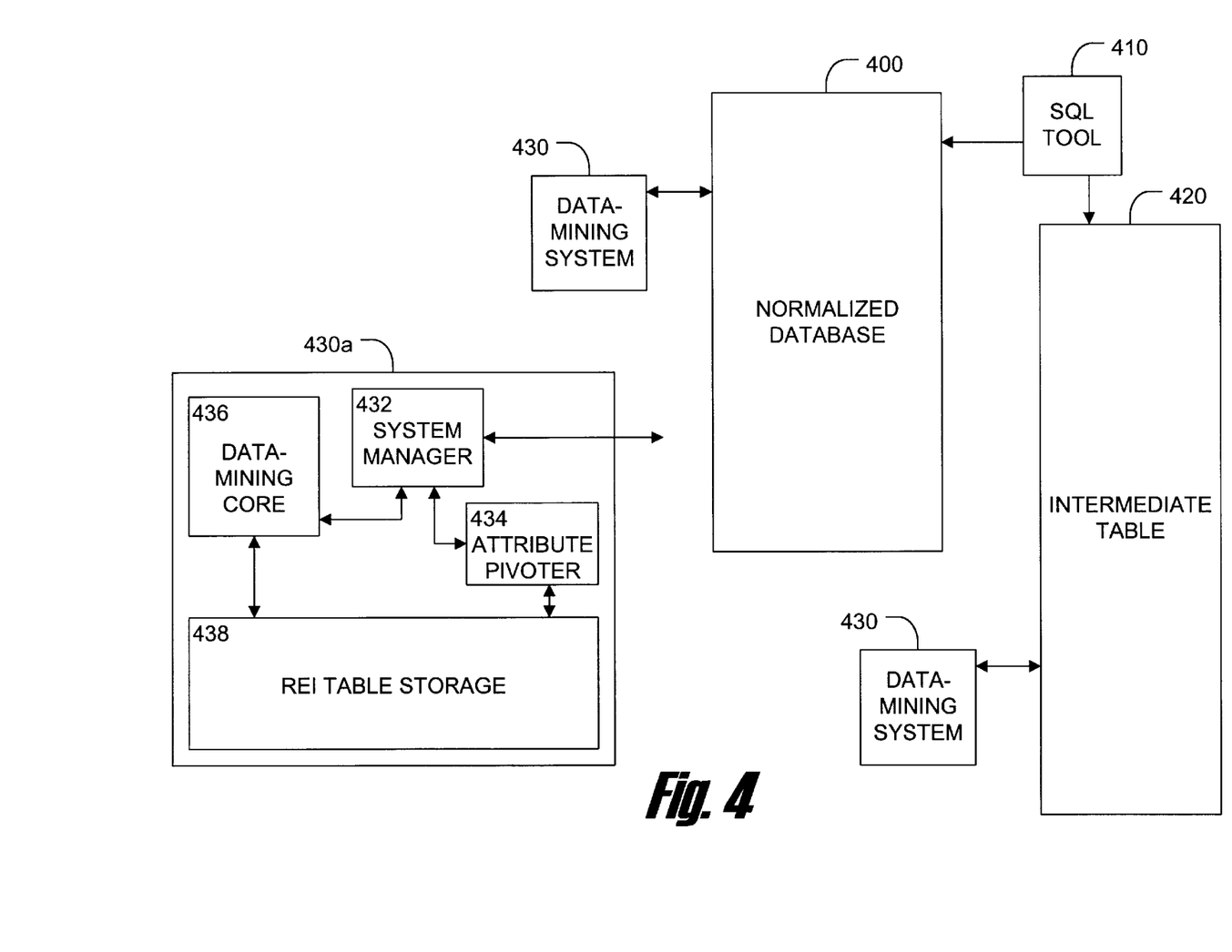
FIG. 4 is a block diagram illustrating an integrated data-mining system in connection with an operational environment according to one embodiment of the present invention.

FIG. 4 is a block diagram illustrating an integrated data-mining system in connection with an operational environment according to one embodiment of the present invention. Referring now to FIG. 4, a data-mining system 430 implements the methods disclosed herein, and is shown in two connection configurations within an exemplary operational environment. The first connection configuration is that of the data-mining system 430 coupled with a normalized database 400. In a presently preferred embodiment, the normalized database 400 is in third normal form and is part of a data warehouse. The second connection configuration is that of the data-mining system 430 coupled with an intermediate table 420, which is generated by a standard query language (SQL) tool 410, which is coupled with the normalized database 400. In a preferred embodiment, SQL tool 410 is one part of a database management system (DBMS), which is part of the data warehouse.

The SQL tool 410 is used to query the normalized database 400, thereby generating the intermediate table 420, which contains data records sought. The data-mining system 430 operates directly with the normalized database 400, the intermediate table 420, or with any relational database in at least first normal form.

A data-mining system 430a is an expanded view of the data-mining system 430. The data-mining system 430a comprises a system manager 432, an attribute pivoter 434 and a data-mining core 436. Additionally, in a preferred embodiment, the data-mining system 430a further comprises a storage for REI tables 438.

In one embodiment, the data-mining core 436 comprises multiple data-mining tools that implement multiple data-mining algorithms. Preferably, the data-mining core 436 is designed in a modular fashion such that new data-mining tools can be plugged in and used along side traditional data-mining tools, without extensive modifications of the data-mining system 430a.

In another embodiment, the data-mining core 436 comprises a communications interface for sending data in an REI table form to a plurality of data-mining tools. In this fashion, the data-mining system 430a becomes a distributed data-mining system, thereby enabling extensive multitasking of the data-mining process. For example, the system manager 432 can send a single REI table to multiple sites around the world using the data-mining core 436 and a global computer network. The multiple sites perform separate and sometimes proprietary data-mining analyses before returning analysis results to the data-mining system 430a.

The system manager 432 is thus enabled to compare analysis results from disparate data-mining techniques, which may not be available directly for plugging in to the data-mining system 430a. In addition, the system manager 432 is thus enabled to use widely dispersed processing capabilities, thereby expanding the possibilities for fast analysis of large volumes of data. For example, the present invention could be used in connection with a company's intranet to glean processing power from the desktop computers of its employees. Each desktop computer has a local data-mining tool. At the end of the business day, the system manager 432 sends a large data set in an REI table form to each desktop computer via the data-mining core 436. During the night, each desktop computer performs a different data-mining analysis. The analysis results are sent back to the system manager 432 for cross-correlation, meta-analysis and presentation to a system user.

The attribute pivoter 434 implements the methods disclosed herein. The system manager 432 uses the attribute pivoter 434 to generate REI tables for data mining. The system manager 432 identifies a nature of data coming in via an input/output interface contained within the data-mining system 430a. The input/output interface preferably provides Open DataBase Connectivity. By identifying the nature of the data coming in, the system manager 432 can determine when further data partitioning or querying is needed.

For example, when the data-mining system 430a is used with the intermediate table 420, the nature of the data is such that further partitioning or querying is usually unnecessary. On the other hand, when the data-mining system 430a is used with the normalized database 400, further partitioning or querying of the data will likely be necessary, since current data-mining tools typically require a data set that is much smaller than the amount of data stored in current data warehouses. When further partitioning or querying of the data is needed, the system manager 432 enables the system user to perform these functions, preferably through appropriate calls to DBMS tools included in the data warehouse.

In addition, in an alternative embodiment, the system manager 432 is designed to perform partitioning automatically, as required by the data-mining tools available via the data-mining core 436. In a related embodiment, the system manager 432 is integrated with the data-mining tools, available via the data-mining core 436, such that sampling steps performed by the data-mining tools can be broken up, thereby enabling savings in storage space and processing time.

Figure 5:
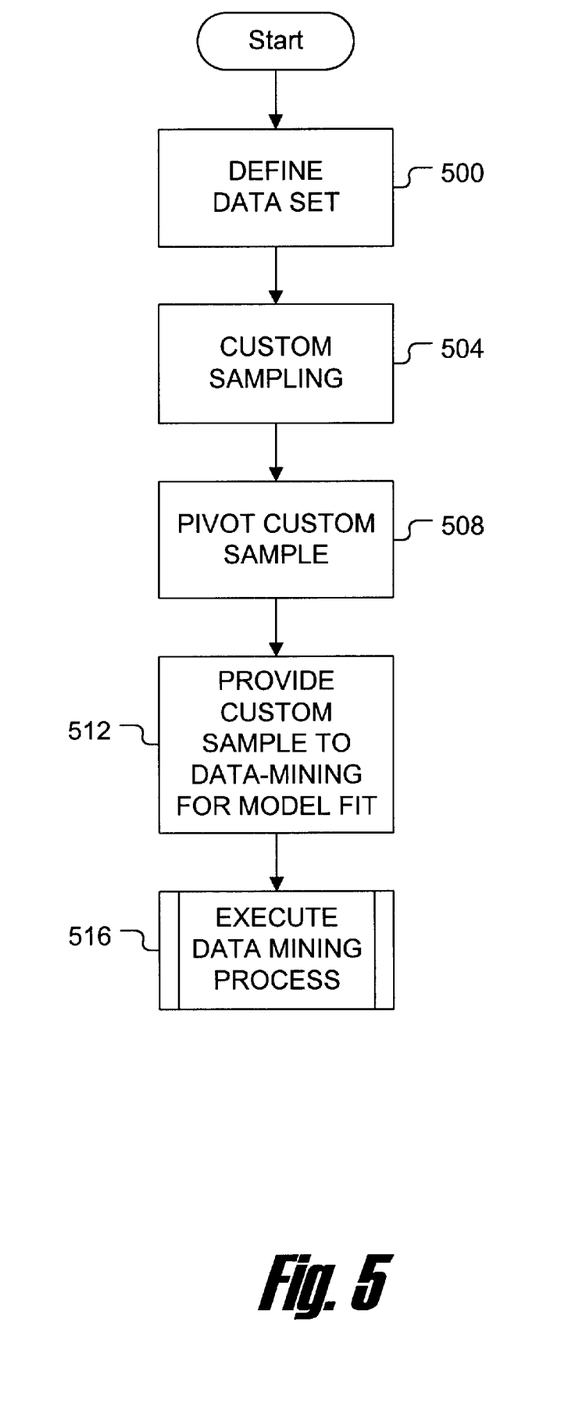
FIG. 5 is a flowchart depicting a method for data-mining sampling according to one embodiment of the present invention.

FIG. 5 is a flowchart depicting a method for data-mining sampling according to one embodiment of the present invention. In this embodiment, the system manager 432 is integrated with at least one of the data-mining tools, available via the data-mining core 436, and performs the method described herein. Referring now to FIG. 5, the method begins with step 500, in which a data set is defined. Generally, this step is performed by the system user who selects which portion of a normalized database to analyze. However, many data-mining tools cannot handle the large quantities of data present in today's data warehouses. For example, traditional data-mining tools require an input data set to be in the neighborhood of 2,000 to 10,000 rows, whereas a week's worth of data for modem manufactures of disk drives typically has 200,000 to 300,000 rows. Thus step 500 is also a limiting step whereby the method ensures that the data-mining tool being used is not overwhelmed by a very large data set.

In step 504, the data set is "custom sampled" to create a sample for data mining. The term "custom sampled" is used to emphasize that conventional sampling methods used in data warehouse applications are not effective. Because traditional data mining tools work with input data sets typically ranging from a few hundred to several thousand rows, sampling of the data must be performed in a manner which is customized to and consistent with the specific application. This sampling can be based on random count (a predefined count of rows are selected randomly), random percentage (a predefined percentage of rows are randomly selected, probability (each row is assigned a random probability of selection, rows greater than a certain level are chosen), stratified (rows are weighted for selection based on an additional criteria), etc. It is preferable to do sampling prior to the attribute pivot because of the improved efficiencies in pivoting a smaller number of elements. Because the data is in a normalized form prior to the pivot, the sampling, algorithm must identify and select all relevant attributes prior to the pivot (e.g., for a drive with 4 heads the attributes associated with all 4 heads must be selected as part of the sample). This type of custom sampling does not exist in traditional data mining tools and is implemented prior to the attribute pivoting step 508 in FIG. 5. The custom sample is pivoted in step 508 and then the sample is provided to the data-mining tool for modeling in step 512. The data-mining tool attempts to fit a model to the sample using its internal algorithms.

As mentioned above, the method may also employ stratified sampling. Stratified sampling is where a probability of taking a data element from a favored population in the data set is greater than a probability of taking a data element from a non-favored population. Stratified sampling is very useful to manufacturers, which need to model the causes of "quality bubbles." In a stratified sampling embodiment of the present invention, the data set is first split into the favored population and the non-favored population. The favored population is pivoted and then sampled to obtain half of the sample for data-mining. The non-favored population is sampled and then pivoted to obtain the other half of the sample for data mining.

In step 516, the data mining process is executed based on the model produced with the pivoted, stratified sample.

The invention may be practiced using a number of commercially available computer systems such as an NCR 550 by NCR corporation, or Compaq Prosignia™ 2000 by Compaq corporation, or Dell PowerEdge™ 4400 by Dell Corporation; or other systems having capacity and performance commensurate with a particular desired data mining application.

What is claimed is:

1. In a data-mining system for use with a database stored in a normalized form, a method for preparing a data record with multidimensional attributes for processing by a data-mining tool, the method comprising the steps of
identifying a normalized data record, which includes an existing attribute comprising a plurality of dimensions;
generating a plurality of new attributes corresponding to the plurality of dimensions of the existing attribute;
creating an REI data record comprising the plurality of new attributes; and
associating a plurality of value instances corresponding to the dimensions of the existing attribute with the plurality of new attributes.

2. The method of claim 1, wherein said identifying step further comprises the step of examining a constraint for an attribute.

3. The method of claim 2, wherein said examining step further comprises examining a domain for the attribute.

4. The method of claim 1, wherein said generating step further comprises the step of making names for the new attributes, the names being a composite of an existing name for the existing attribute and a set of domain values for a dimension attribute corresponding to the plurality of dimensions.

5. The method of claim 1, wherein the REI data record further comprises additional attributes and said creating step further comprises creation of an REI table comprising the plurality of new attributes and the additional attributes.

6. The method of claim 1, wherein said associating step further comprises the step of determining indices that refer to the normalized data record.

7. In a data-mining system for use with a database stored in a normalized form, a method for transforming a subset of the database, with multidimensional attributes, into an REI table for processing by a data-mining tool, the method comprising the steps of
selecting a data-item key;
identifying a composite key comprising the data-item key and a local key attribute; determining a dimensionality of the local key attribute;
generating new non-key attributes based upon the dimensionality of the local key attribute and non-composite-key attributes;
creating an REI table defined by the data-item key and the new non-key attributes; and associating value instances with the REI table.

8. The method of claim 7, wherein said selecting step further comprises the step of querying a user.

9. The method of claim 7, wherein said selecting step further comprises the step of finding a pervasive attribute that is part of all tables making up a database subset being transformed.

10. The method of claim 7, wherein said identifying step further comprises the step of examining a constraint for the local key attribute.

11. The method of claim 7, wherein said identifying step further comprises the step of obtaining input from a user.

12. The method of claim 7, wherein said determining step further comprises the step of examining a constraint for the local key attribute.

13. The method of claim 12, wherein said examining step further comprises examining a domain for the local key attribute.

14. The method of claim 7, wherein said generating step further comprises the step of making names for the new non-key attributes, the names being a combination of non-composite-key names for the non-composite-key attributes and a set of domain values for the local key attribute.

15. The method of claim 7, wherein the REI table is further defined by additional attributes.

16. The method of claim 7, wherein said associating step further comprises the step of saving indices that refer to the value instances.

17. The method of claim 7, wherein said associating step further comprises the steps of examining a special-case non-key attribute; and excluding from said associating step all data rows having a non-priority value for the special-case non-key attribute.

18. A computer program product for use in a data-mining system, said computer program product including a medium usable by a processor, the medium having stored thereon a sequence of instructions which, when executed by the processor, causes the processor to execute a process that pivots multidimensional attributes thereby enabling the data-mining system to analyze data stored in a normalized database having multidimensional attributes, said computer program product comprising:

instructions for identifying a composite key comprising a data-item key and a local key attribute;

instructions for generating new non-key attributes based upon a dimensionality of the local key attribute and non-composite-key attributes;

instructions for creating an REI table defined by the data-item key and the new non-key attributes; and instructions for associating value instances with the REI table.

19. The computer program product of claim 18, wherein said instructions for identifying further comprise:

instructions for querying a user to select the data-item key; instructions for enabling the user to identify the local key attribute; instructions for finding a pervasive attribute to be used as the data-item key; and instructions for examining constraint and domain information for the local key attribute.

20. The computer program product of claim 18, wherein said instructions for generating further comprise instructions for making names for the new non-key attributes, the names being a combination of non-composite-key names for the non-composite-key attributes and a set of domain values for the local key attribute.

21. The computer program product of claim 18, wherein the REI table is further defined by additional attributes.

22. The computer product of claim 18, wherein said instructions for associating further comprise instructions for saving indices that refer to the value instances.

23. The computer program product of claim 18, wherein said instructions for associating further comprise:

instructions for examining a special case non-key attribute; and instructions for excluding unwanted value instances from the REI table, when the unwanted value instances belong to a data row having a non-priority value for the special-case non-key attribute.

\* \* \* \* \*